United States Patent
Donlin et al.

(10) Patent No.: US 7,480,789 B1
(45) Date of Patent: Jan. 20, 2009

(54) VIRTUAL FILE SYSTEM INTERFACE TO CONFIGURATION DATA OF A PLD

(75) Inventors: Adam P. Donlin, Los Gatos, CA (US); Patrick Lysaght, Los Gatos, CA (US); Brandon J. Blodget, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 1025 days.

(21) Appl. No.: 10/812,643

(22) Filed: Mar. 29, 2004

(51) Int. Cl.
*G06F 9/00* (2006.01)
*G06F 9/24* (2006.01)

(52) U.S. Cl. .............................. 713/1; 713/2; 713/100
(58) Field of Classification Search .................. 713/1
See application file for complete search history.

(56) References Cited

U.S. PATENT DOCUMENTS

| | | | |
|---|---|---|---|
| 7,024,427 B2 * | 4/2006 | Bobbitt et al. .............. 707/200 |
| 7,207,041 B2 * | 4/2007 | Elson et al. .................. 718/104 |
| 7,269,696 B2 * | 9/2007 | Muhlestein et al. ......... 711/147 |
| 2002/0122056 A1 * | 9/2002 | Bhesania et al. ............ 345/744 |
| 2003/0191810 A1 * | 10/2003 | Muhlestein et al. ......... 709/215 |

* cited by examiner

*Primary Examiner*—Thomas Lee
*Assistant Examiner*—Michael J Brown
(74) *Attorney, Agent, or Firm*—LeRoy D. Maunu; Kim Kanzaki; Lois D. Cartier

(57) ABSTRACT

Methods and apparatus are described for providing access to data in a programmable logic device (PLD). A hierarchy of directories and files are maintained in a virtual file system, which is registered with an operating system. The directories and files are associated with resources of a PLD. In response to program calls to file system routines that reference files associated with resources of the PLD, the virtual file system is invoked, and the virtual file system accesses state information in resources of the PLD.

27 Claims, 5 Drawing Sheets

VIRTUAL FILE SYSTEM INTERFACE TO CONFIGURATION DATA OF A PLD

FIELD OF THE INVENTION

The present invention generally relates to accessing configuration data of a programmable logic device (PLD).

BACKGROUND

The technology of programmable logic devices (PLDs) has progressed to a level such that it is possible to implement a microprocessor on a PLD and host an operating system such as Linux. Not only may this support various system on a chip (SOC) applications, but with the capabilities of a PLD such as a Virtex field programmable gate array (FPGA) from Xilinx, the SOC is reconfigurable to suit changing requirements or adjust to changing environmental conditions.

The configuration of a PLD such as an FPGA, generally refers to the state of the configurable logic resources of the device as programmed to accomplish a set of required functions. Data that is loaded into the device for a desired configuration may be referred to as configuration data. The state of the device generally refers to the contents of registers in the device at a chosen time while the device is performing the desired functions.

Devices such as the Virtex FPGA have various modes available for accessing the configuration data and state. For example, for general needs the SelectMap interface of the Virtex FPGA may be used to load a configuration bitstream into the device from an external memory or read back configuration data from the device. For testing and diagnostic activities, a boundary scan interface may be used to establish or read back state data. The internal configuration access port (ICAP) may be implemented on a Virtex FPGA to manipulate configurable resources by, for example, an embedded processor, (i.e., self-controlled configuration) after the device has already been configured.

Even though these interfaces for accessing configuration data or device state are suitable for most purposes, the interfaces are low-level (less abstract) and may be unnecessarily complex for some applications. For example, to the developer of an application in which the PLD is to be re-configured while being part of a running system (run-time reconfiguration), the low-level interface may not be familiar. The developer's lack of familiarity may present scheduling, reliability, and cost issues.

The present invention may address one or more of the above issues.

SUMMARY OF THE INVENTION

The various embodiments of the invention provide methods and apparatus that support access to data in a programmable logic device (PLD). A hierarchy of directories and files are maintained in a virtual file system, which is registered with an operating system. The directories and files are associated with resources of a PLD. In response to program calls to file system routines that reference files associated with resources of the PLD, the virtual file system is invoked, and the virtual file system accesses state information in resources of the PLD. In various other embodiments, the PLD configuration data may be remotely viewed via a network file system interface.

Various means are described for providing access to PLD configuration data. Means are described for maintaining a hierarchy of directories and files in a virtual file system. In support of providing access to the PLD configuration data, means are described for providing access to PLD resources, via both local access and network access to the PLD.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention support access to PLD configuration data via program calls to file system routines of an operating system kernel. A processor is implemented on a PLD, and an operating system having program callable file system routines executes on the processor. The configuration data is managed in a virtual file system which is registered with the operating system. Access to the PLD configuration data is made through the program invoking standard system calls for file system routines, which in turn invoke the virtual file system. The virtual file system (VFS) reads, writes, or modifies the configuration data according to the file system calls. In one embodiment, the virtual file system interfaces with a configuration controller implemented on the PLD, and the configuration controller manipulates the configuration data on the PLD.

The approaches described herein for providing access to PLD configuration data may be useful for a variety of purposes such as use of the VFS by application level archiving and revision control program suites. For example, the VFS approach may be useful for configuration management. By using the file system approach, standard revision control systems may be used to manage the configuration data for a variety of PLD applications. Revision control systems are able to reconcile the version (revision) of a given file to that in a central repository. With past approaches, revision control systems have been generally used to manage the configuration data of a PLD as a monolithic data set, i.e., the configuration bitstream. With the VFS approach, the revision control system may control and track the configuration data to a user-specified level of file abstraction.

The various embodiments of the invention support creation and restoration of archive collections of VFS files using standard file archiving tools. The data within the files represents the configuration (and/or state) of the PLD and may be applied at a remote system by using the same archive tool to re-write the files into the appropriate regions of the VFS hierarchy.

The configuration data is stored in a hierarchical directory structure, which provides device independence/abstraction. The hierarchical directory structure may be used to allow configuration data intended for one device size/architecture/family to be applied to another device with a different size/architecture/family. This may be implemented at the VFS driver level.

Figure 1:
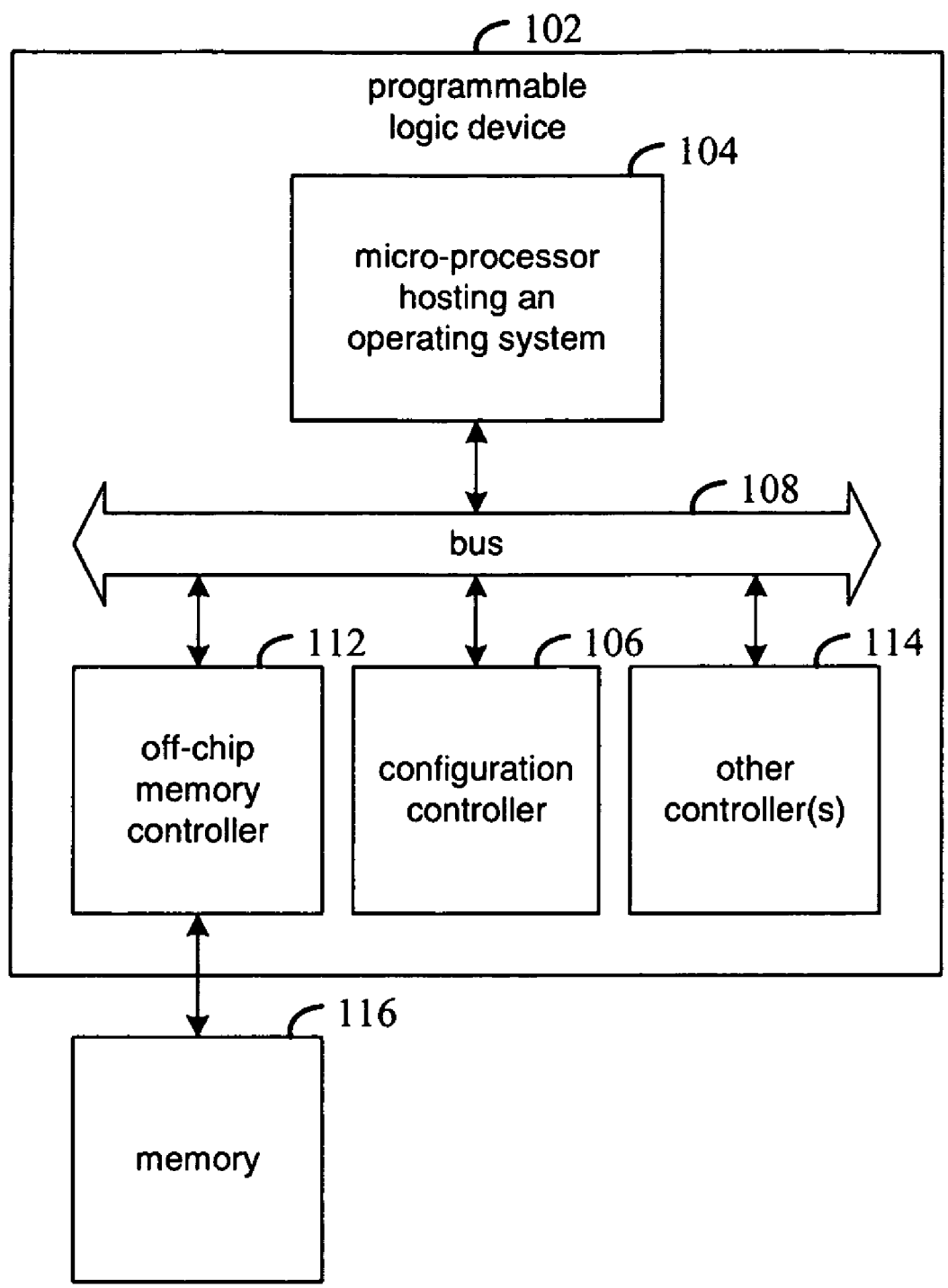
FIG. 1 is a block diagram that illustrates a programmable logic device (PLD) having implemented therein a microprocessor.

FIG. 1 is a block diagram that illustrates a programmable logic device (PLD) 102 having implemented therein a microprocessor 104. The microprocessor 104 may be implemented with the PLD logic and in one embodiment hosts an operating system, such as Linux, that supports a VFS.

In addition to the microprocessor, the PLD 102 has implemented therein a configuration controller 106 which interfaces with the microprocessor via bus 108. The configuration controller supports access to the configuration state of the PLD over general interconnect circuitry within the device. For example, in one embodiment, the PLD 102 is a field programmable gate array (FPGA) such as a Virtex FPGA from Xilinx, Inc., and the configuration controller 106 may be implemented with the internal configuration access port (ICAP).

ICAP allows configuration of the internal logic resources after the device is configured. The ICAP block exists in the lower right corner of the array and emulates the SelectMAP configuration protocol from Xilinx. ICAP supports reconfiguration of the device and bus interfaces such as the peripheral component interface (PCI).

In other embodiments, the configuration controller 106 may be implemented with a SelectMap or JTAG boundary scan or other physical port having access to a configuration bitstream stored internal to the PLD, external to the PLD or any combination thereof. In addition the microprocessor hosting the operating system supporting the VFS may be internal or external to the PLD. For example, the VFS can be running on a processor external to the PLD and the VFS uses the SelectMap/BoundaryScan/other-physical-port to manipulate the configuration data on the PLD.

Depending on application and implementation requirements, the PLD may be configured with additional controllers, for example, controllers 112 and 114, that provide access to off-chip resources. For example, controller 112 may be a memory controller that provides access to memory 116. It will be appreciated that a variety of commercially available or proprietary memory architectures and interfaces may be used to implement the memory controller and memory. Other types of controllers, illustrated by block 114, may provide network or communications interfaces and access to retentive storage systems such as tape drives and disk drives.

The various embodiments of the invention provide access to configuration data of a PLD via a virtual file system (VFS). An operating system such as Linux supports virtual file systems (VFSs). For example, the Linux "/proc" VFS allows user-space applications to access the selected ones of the operating system kernel's data structures via basic file I/O operations or function calls. From the perspective of a userspace application, access is made to the configuration data by calling the same file system routines as are called for accessing a file on a storage media such as a disk. However, the access is actually to a data structure in the kernel's memory. In various embodiments of the present invention, access is to the actual configuration data of configurable logic resources of an FPGA or state data of memory cells in the FPGA. It may in general be desirable to access the FPGA configuration data and state data directly rather than caching the data in kernel memory.

Figure 2:
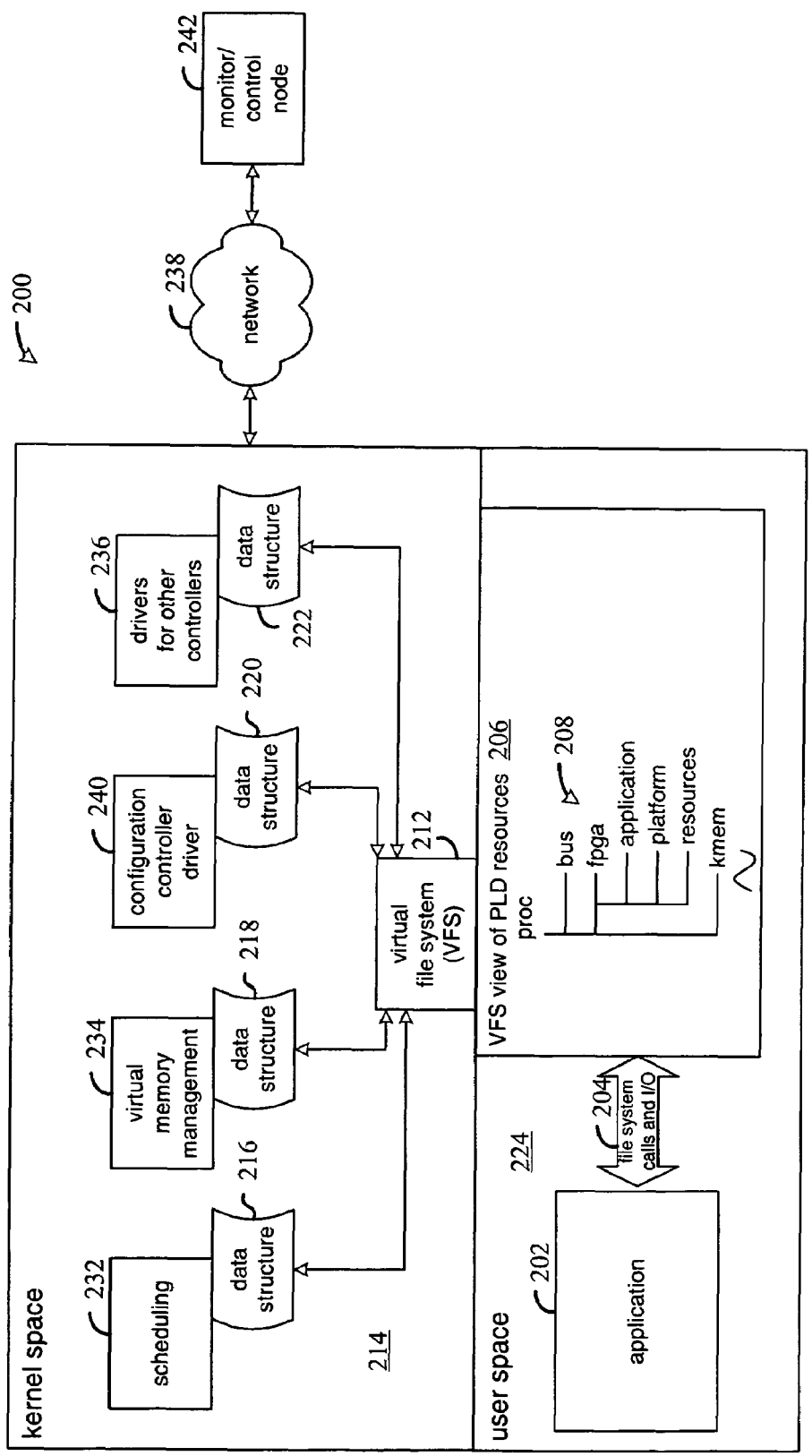
FIG. 2 is a functional block diagram that illustrates a system in which the configuration of a PLD is made accessible via a virtual file system.

FIG. 2 is a functional block diagram that illustrates a system 200 in which the configuration of PLD resources is made accessible via a virtual file system. The application need not directly interface with the configuration controller driver. Instead, the application may make file system calls to the VFS extension, which hides the complexity of the configuration controller from the application.

In an example embodiment, an application program 202 makes file system calls 204 that reference the VFS-implemented view of the PLD resources 206. The PLD resources are represented in the VFS by the LINUX/proc file system in an example embodiment. The application view of the representation is shown as the directory hierarchy 208.

The example directory hierarchy 208 shows an FPGA directory along with example bus and kernel-memory (kmem) directories. The bus and kmem directories illustrate additional kernel-managed resources that may be accessible via a VFS. An FPGA is used as an example of a PLD whose configuration data may be made accessible via the VFS. The configuration data of the FPGA is organized into directories that represent the data by application, by platform areas, and by resources, as shown in more detail in FIGS. 3A-3D. It will be appreciated that the application subdirectory under the FPGA directory relates to the application implemented on the FPGA as compared to the application 202 which may manipulate the FPGA configuration data.

The VFS 212 operates in kernel memory space 214 and provides access to kernel data structures 216, 218, 220, and 222 for application 202, which operates in user memory space 224. The VFS is accessible to the application via file system calls, and the VFS interfaces with the respective kernel components or drivers that manage the referenced data. Example components and drivers in the kernel include a scheduling component 232, a virtual memory management component 234, and other drivers 236 for interfacing with other data structures. The other drivers may include, for example, drivers for interfacing with data communications network 238.

In one embodiment, driver 240 provides VFS access to the configuration controller 106 (FIG. 1). The data accessed by driver 240 is the configuration state of the FPGA as referenced by the parameters in the file system calls made by application 202.

In another embodiment, the driver 240 may be invoked from a network-connected node 242 for controlling or monitoring the FPGA configuration state. This may allow a remote system to maintain a higher-level directory structure that represents the configuration data for all the PLDS that are deployed and managed by the node. Opening a directory/file at node 242 would transparently invoke network file system protocols within node 242 and the file system implemented on the PLD would act as a client. An example use of the network-connected embodiment may involve determining differences between the configuration data of separate PLDs in order to diagnose problems. Standard tools may be used with the embodiments for revision control and archiving of configuration data.

It will be appreciated that in yet another embodiment, the network-connected node 242 could implement the VFS view of directories and files of configuration data instead of the PLD implementing the file system logic.

Figure 3A:
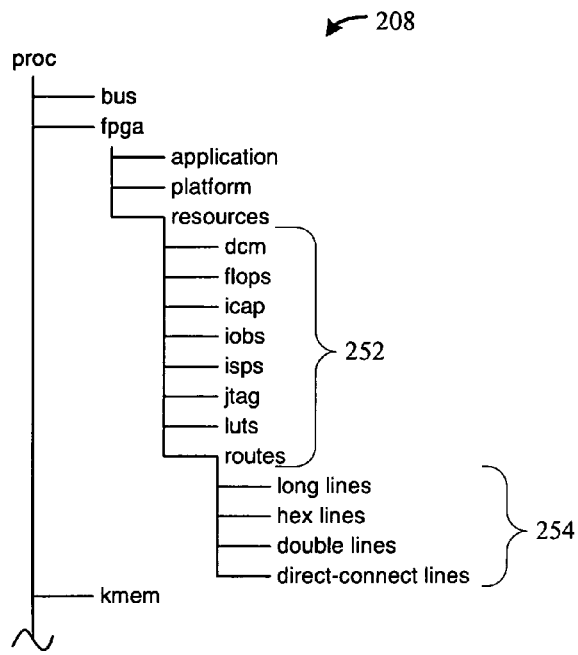
FIGS. 3A, 3B, 3C, and 3D illustrate examples of various alternative hierarchies of directories and files that are associated with configuration data of an FPGA.

FIGS. 3A, 3B, 3C, and 3D illustrate various alternative hierarchies of directories and files that are associated with configuration data of an FPGA. FIG. 3A shows configurable resources of the FPGA for which the configuration data may be modeled as files in a directory hierarchy. The resources directory includes sub-directories for a digital clock manager ("dcm"), FPGA flip flops ("flops"), internal configuration access port ("icap"), input/output blocks ("iobs"), instruction set processors ("isps"), boundary scan architecture ("itag"), look-up tables ("luts"), and routing resources ("routes"). The class of configuration data is modeled as directories 252.

Within each of directories 252 are further directories or files that represent the configuration data of the FPGA for the resources identified by the directory. For example, the routes directory contains directories 254 for routing resources of the FPGA, including "long lines", "hex lines", "double lines", and "direct-connect lines" directories. Each of directories 254 may contain a directory or file for each instance of the specific routing resource.

Figure 3B:
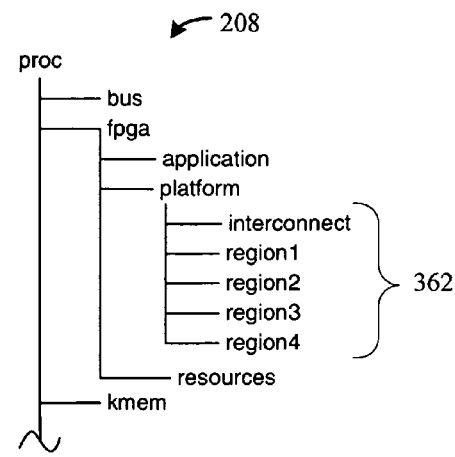

The platform view shown in FIG. 3B illustrates modeling of FPGA configuration data by region of the device. The example includes directories for four example regions, region1, region2, region3, and region4. In addition, the platform directory includes a directory named, interconnect, for routing resources that connect the regions. Under each of the region directories, region1, region2, region3, and region4, a file represents the configuration data for resources within an area of the FPGA associated with the directory. For example, the device may be viewed as having resources in 4 quadrants, each region directory may be a associated with one of the quadrants.

In an example embodiment, the files within each region may also be used to store statistical information pertaining to the region. For example, a file may contain information that indicates the spatial utilization of the region. The total area of the region is communicated to the VFS device driver in a configuration file or by kernel module options. The configuration file may be communicated to the VFS device driver by way of a symbolic ("sym") file handle. A sym file handle is a portal to an interpreter implemented in the VFS driver to which the configuration file may be written. In response, the VFS takes note of the information contained in the configuration file and applies whatever corresponding actions are necessary. Sym files may also be used to communicate which regions exist, the names of the cores, where the registers are placed, and the symbolic names of the registers, for example. This allows the VFS to establish a directory hierarchy for an application with the appropriate directory names and files within those directories.

The spatial utilization of the region may be determined by the VFS module monitoring which parts of the configuration data are affected during configuration. In another embodiment, the configuration data may be accompanied by a configuration mask that could be parsed to reveal the same utilization information. The files could also be used as portals through which new configuration information could be placed into the region. Furthermore, if two regions were compatible at a physical level, the file from one region directory could be copied to the other region directory, resulting in a partial configuration bitstream being loaded into the region of the FPGA associated with the target directory.

Figure 3C:
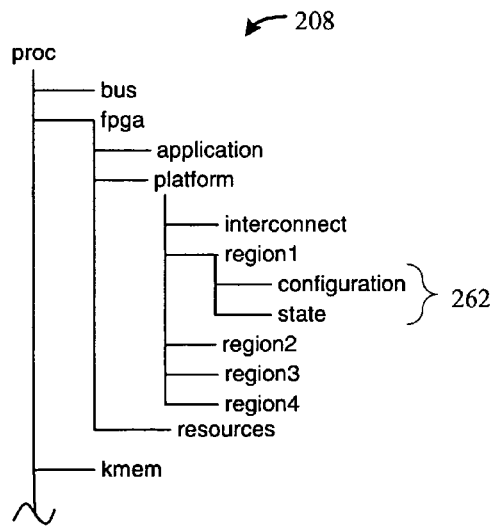

In yet another embodiment, the configuration data associated with a region directory may be further organized by configuration data and state data as shown in FIG. 3C. Configuration data refers to the state of resources of the FPGA that are programmable to implement a desired function, and state data refers to the state of elements of the FPGA that may be subject to change while the FPGA is performing its programmed functions, such as flip flops, registers, and memory. Each region directory may have separate directories for each of the configuration and state data, as illustrated by directories 262 under the directory, region1. It will be appreciated that each region directory may have configuration and state files instead of further subdirectories (entries 262 could be files instead of subdirectories).

Figure 3D:
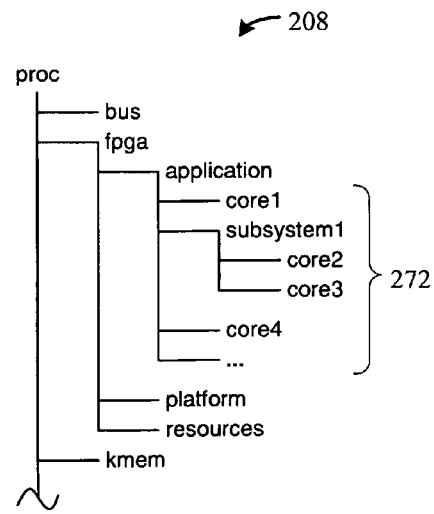

FIG. 3D illustrates example core and subsystem subdirectories 272 under the application directory. Under the application view, there are subdirectories for the constituent cores and subsystems implemented on the FPGA. For example, the application directory in FIG. 3D includes core directories, core1 and core4, along with a subsystem directory, subsystem1, which further includes sub directories, core2 and core3. The files under each core or subsystem directory may represent the registers in the core. Each file representing a register could be interrogated by opening and reading from the file or modified by writing to the file. The behavior of a core may be modified, to the extent allowed by the core, by reprogramming the registers via the file system calls to update the necessary file(s).

In another embodiment, each core directory may further include subdirectories that map to the levels in the application hierarchy (such as that created with a design tool). A file representing the configuration of a part of the core's design hierarchy could be moved or copied to the corresponding level in the core's directory within the VFS directory hierarchy. The file acts as a configuration portal, and overwriting the file substitutes that part of the application design hierarchy with alternative functionality. It will be appreciated that the configuration data that implements the alternative functionality must fit within the same physical region of the FPGA as that region in which the original functionality is implemented.

In support of manipulating configuration data under the application view, symbol data is provided to the driver of the configuration controller. The symbol data enumerates the core's name, type, constituent registers and physical locations, along with design information that describes the logical and physical hierarchy of the design. This information may be provided to the driver via a file in the application directory when the application 202 (FIG. 2) begins executing, and the driver populates its internal data structures with this information.

Figures 4, 5:
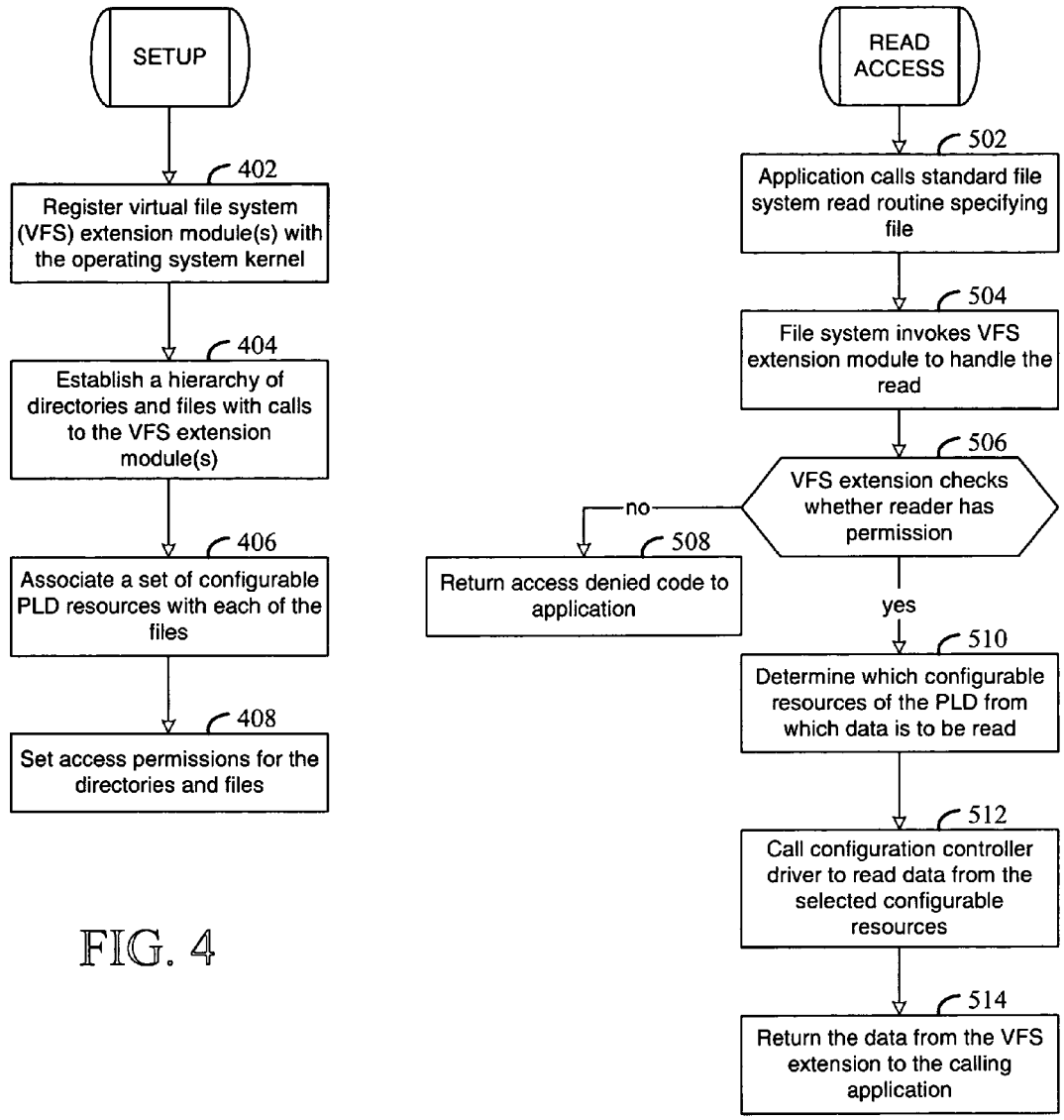
FIG. 4 is a flowchart of an example process for establishing a hierarchical directory and file view of PLD resources in accordance with various embodiments of the invention.
FIG. 5 is a flowchart of an example process for providing read access to data of a PLD via the hierarchical directory and file view of the PLD resources.

FIG. 4 is a flowchart of an example process for establishing a hierarchical directory and file view of PLD resources in accordance with various embodiments of the invention. The process begins with registration of modules that extend the VFS with the operating system kernel (step 402). Registration informs the kernel that a module exists and may be loaded when the module is to be used and unloaded when use of the module is complete, such as for dynamically linked libraries (DLLs). The particular mechanism by which modules register with an operating system may vary for different types of operating systems. Alternatively, a module may be statically compiled with the kernel.

An application may then make file system calls to establish a hierarchy of directories and files that represent the configuration data of the PLD (step 404). In another embodiment of the VFS, the hierarchy of directories is created by the VFS module when the module is first loaded. As noted below, in the dynamic version of the VFS, the files and directories are created by the VFS in response to the application doing a 'cd'/'ls', etc. in the VFS directory space. The file system routines in turn call the VFS extensions, which create the directories and files. In making the file system calls, configurable resources of the PLD are associated with the directories and files (step 406).

File system access control and file locking may also be implemented for the directories and files that represent the configuration data of the PLD. This functionality is typically provided by the kernel system code rather than the VFS extensions. In one embodiment, the configuration controller driver 240 (FIG. 2) may set owner and access permissions for given files and directories (step 408).

It will be appreciated that the actions of the process of FIG. 4 may be performed somewhat differently when the concepts of the present invention are implemented on different operating systems.

In an alternative embodiment, the directory and files may be created on demand. That is, parts of the directory hierarchy are generated only when needed. For example, in a VFS, directories and files may be generated as a process begins execution and deleted when the process exits. In one embodiment, when an application changes a view to a particular directory (e.g., the "cd" command in LINUX) the VFS dynamically creates the file system data structures to represent the required resources. In one embodiment, the required resources are hard coded into the implementation of the VFS module. In another embodiment, a configuration mask file may be used to only create the subset of files representing the resources used by the current FPGA configuration.

FIG. 5 is a flowchart of an example process for providing read access to data of a PLD via the hierarchical directory and file view of the PLD resources. To read configuration data, an application calls a standard file system routine to read a designated file (step 502). The file system in turn calls the VFS extension module for reading configuration data (step 504).

The extension module checks whether the application has permission to read the specified file (or directory) (step 506). If the application lacks permission, control is returned to the calling application with a code that indicates access was denied.

If the application has the requisite permission, the VFS extension modules determines from which configurable resources of the PLD the configuration data is to be read (step 510). This information may be obtained from the configuration controller driver data structures 220 (FIG. 2). The configuration controller driver is then called to read configuration data from the appropriate resources of the PLD (step 512), and the data is returned from the VFS extension to the calling application (step 514).

Figure 6:
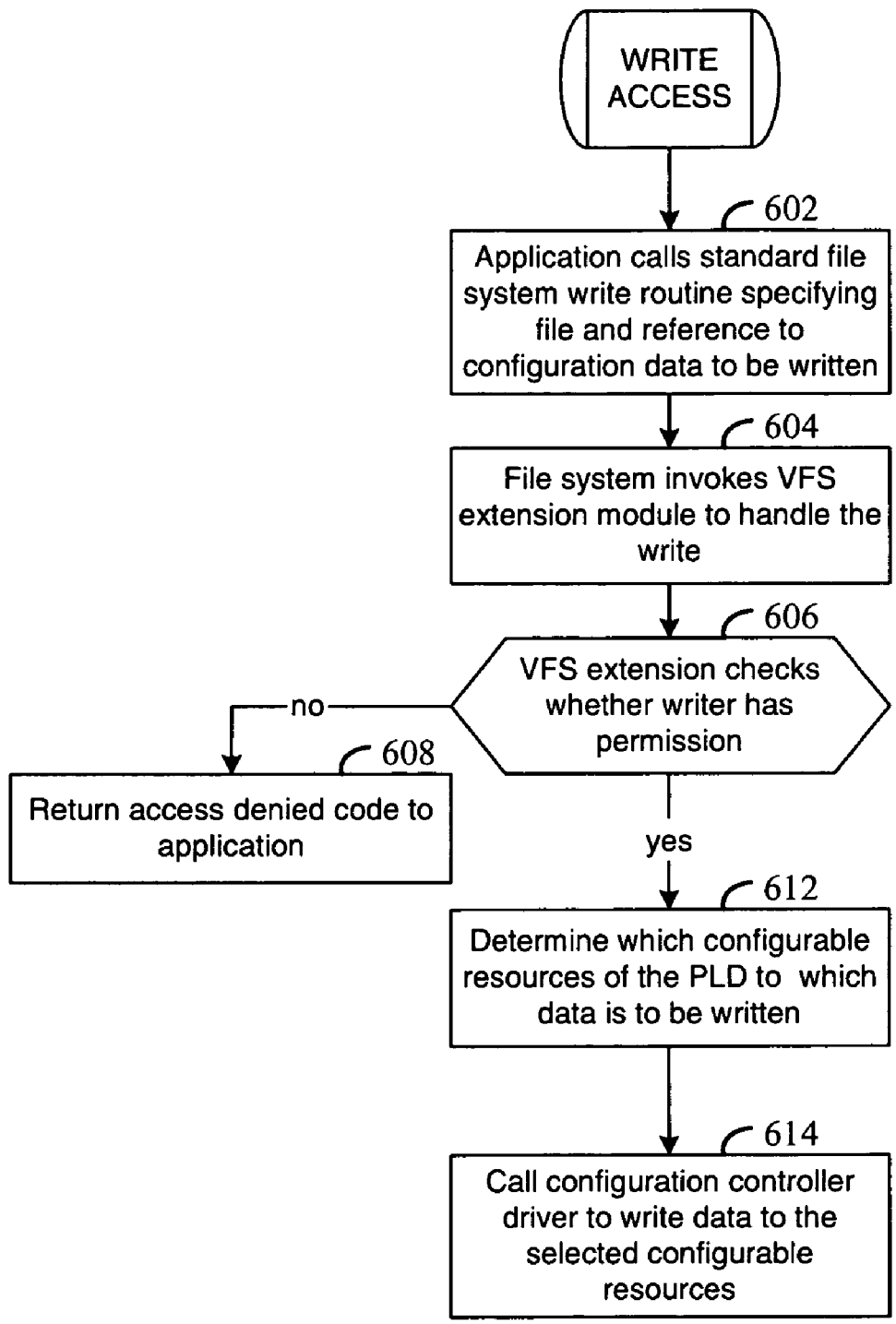
FIG. 6 is a flowchart of an example process for providing write access to data of a PLD via the hierarchical directory and file view of the PLD resources.

FIG. 6 is a flowchart of an example process for providing write access to data of a PLD via the hierarchical directory and file view of the PLD resources. The write process of FIG. 6 is similar to the read process of FIG. 5, with the difference being that a write operation is performed instead of a read operation.

To write configuration data, an application calls a standard file system routine to write a designated file (step 602). The file system in turn calls the VFS extension module for writing configuration data (step 604). The extension module checks whether the application has permission to write the specified file (or directory) (step 606). If the application lacks permission, control is returned to the calling application with a code that indicates access was denied (step 608). If the application has the requisite permission, the VFS extension modules determine from which configurable-resources of the PLD the configuration data is to be written to (step 612). The configuration controller driver is then called to write configuration data to the selected resources of the PLD (step 614).

For both the read and write processes, access to the configuration data may be controlled by way of execute permissions that are associated with executable files. For example, the configuration controller driver 240 may provide customized, executable files that manipulate the other data files available in the subdirectory tree. The executable files may be shell scripts, binary code, or the opening of a file with execute permission may be intercepted and interpreted as a request to perform the operations specified by the file.

In yet another embodiment, the contents of an executable file may be associated with redirecting control flow into the VFS module code itself. The module then performs the specific behavior represented by the given file in response to the user-space request to open the file for execution. The VFS, internally, may schedule the execution of some specific method defined within the VFS driver code. The invoked executable file immediately returns control to the caller. This mechanism is similar to invoking wrapped system calls except actual operating system calls (e.g., UNIX sys or files system calls) are not being invoked. The methods are specific to the VFS's control of the FPGA.

Still further file-based operations may be used in manipulating PLD configuration data. For example, operations on special file types, such as named and anonymous pipes, may be used to trigger functions of the configuration controller driver 240. One example operation is the creation of a named pipe. The actions performed by the VFS extension modules depend on the part of the directory structure (e.g., 208) in which the pipe is created. For example, the VFS extensions may alter the configuration of the portion of the PLD associated with the interconnect file in the platform subdirectory when a named pipe is established between the two regions. Symbolic link files may be interpreted by the VFS extensions for a similar purpose. The difference between named pipes and symbolic link files is that the operating system may create a process for a named pipe, where as the symbolic link is a static object in the file system.

Additional system routines may be defined to operate on the files that represent PLD configuration data. An example is a routine that freezes or halts the PLD. This routine may be needed because it may take hundreds of system clock cycles to read back data from a region of PLD. During this time the states of flip flops, registers, and look-up table RAM may be changing. Thus, a halt routine may be needed to disable the clock to a selected region of the PLD. While the clock is halted, the configuration and state data may be read from the device. A routine that resumes the clock may also be implemented. In some embodiments standard software tools (e.g., diff, tar, cvs) can be used on the files and directories of the VFS to perform debug functions like check pointing, interrogation, archive and roll-back of the PLD state.

In yet another embodiment, the VFS may be configured to mount (the mount function being provided by the host operating system) a bitstream file rather than manipulating the data of an actual FPGA. In this embodiment, the VFS code causes the configuration controller driver to manipulate the data of another file as if it were an actual, live FPGA configuration memory. In this embodiment, the low level function calls of the VFS driver manipulate the contents of a file in some other standard file system, even though to the user of the VFS the appearance is that actual configuration memory of an FPGA is being manipulated.

The bitstream file is a file that is ready for downloading to the FPGA for configuring the device. The VFS may contain low level routines that emulate the memory of the FPGA such that the bitstream data is parsed into the correct, emulated memory cells. Updates are made to the bitstream file by way of actions on the files in the hierarchy.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for accessing configuration data of a PLD and has been found to be particularly applicable and beneficial in managing viewing configuration data of an FPGA. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for providing access to data in a programmable integrated circuit (IC), comprising:
   maintaining a hierarchy of directories and files in a virtual file system that is registered with an operating system, wherein the directories and files are associated with resources of the programmable IC;
   wherein the directories and files have names indicative of resources of the programmable IC;
   in response to program calls to file system routines that reference the names of files that indicate resources of the programmable IC,
   invoking the virtual file system; and
   accessing state information in resources of the programmable IC by the virtual file system,
   wherein the accessing includes:
      reading configuration data from a set of resources of the programmable IC in response to a call to a first file system routine that references the name of a file that indicates the set of resources;
      writing configuration data to a set of resources of the programmable IC in response to a call to a second file system routine that references the name of a file that indicates the set of resources; and
      disabling a clock signal input to the programmable IC in response to a call to a third virtual file system function.

2. The method of claim 1, wherein the resources include configurable logic resources.

3. The method of claim 2, wherein the resources include storage resources.

4. The method of claim 1, wherein the hierarchy of directories and files includes a directory with a plurality of region files, each region file associated with and having a name that indicates resources within an area of the programmable IC associated with the region file.

5. The method of claim 1, wherein the hierarchy of directories and files includes an application directory that includes a hierarchy of application sub-directories and application files, wherein each application subdirectory is associated with and having a names that indicates a subsystem implemented on the programmable IC, and each application file under an application sub-directory represents resources associated with the subsystem of the application sub-directory.

6. The method of claim 1, further comprising:
   associating access permission indicators with selected ones of the directories and files;
   granting read access to configuration data from a set of configurable resources associated with a file in response to a first state of an access permission indicator associated with the file; and
   denying read access to configuration data from a set of resources associated with a file in response to a second state of the access permission indicator associated with the file.

7. The method of claim 6, further comprising:
   granting write access to configuration data from a set of configurable resources associated with a file in response to a third state of an access permission indicator associated with the file; and
   denying write access to configuration data from a set of resources associated with a file in response to a fourth state of the access permission indicator associated with the file.

8. The method of claim 1, wherein the hierarchy of directories and files includes a directory with an executable file, the executable file configured to access state information of the programmable IC, and the method further comprising:
   associating access permission indicators with selected ones of the directories and files;
   granting execution access to an executable file in response to a first state of an access permission indicator associated with the executable file; and
   denying execution access to an executable file in response to a second state of the access permission indicator associated with the executable file.

9. The method of claim 1, wherein the hierarchy of directories and files includes a directory with an executable file, the executable file configured with instructions for interpretation by the virtual file system and instructing access to state data of the programmable IC, and the method further comprising, in response to a request for execution of the executable file, instructing the virtual file system to interpret the instructions of the executable file.

10. The method of claim 1, wherein the hierarchy of directories and files includes a directory with at least one executable file, the executable file configured with one or more control codes for transferring control to the virtual file system, and the method further comprising, in response to a request for execution of the executable file, transferring control to the virtual file system.

11. The method of claim 1, wherein the programmable IC is coupled to a node via a network, further comprising:
   exporting information describing the hierarchy of directories and files to the node; and
   providing network access to the first and second functions of the virtual file system.

12. The method of claim 1, further comprising enabling a clock signal input to the programmable IC in response to a call to a fourth virtual file system function.

13. The method of claim 1, wherein the hierarchy of directories and files includes a directory with a plurality of region directories and each region directory includes a configuration file and a state file, each configuration file associated with configurable logic resources within an area of the programmable IC associated with the region directory, and each state file associated with storage resources within the area of the programmable IC associated with the region directory.

14. The method of claim 1, further comprising:
   connecting configurable logic resources in a first area of the programmable IC to configurable logic resources in a second area of the programmable IC by reconfiguration of routing resources in the programmable IC in response to a call by the application program to a file system routine that specifies a first file associated with the first area of the programmable IC, a second file associated with the second area of the programmable IC, and a pipe.

15. The method of claim 1, further comprising:
implementing a processor on a programmable IC; and
hosting the operating system on the processor.

16. The method of claim 1, further comprising:
interfacing the virtual file system with a configuration controller implemented on the programmable IC; and
accessing programmable IC resources via the configuration controller in response to access requests from the virtual file system.

17. The method of claim 16, wherein the interfacing step comprises interfacing the virtual file system with a configuration controller via a network.

18. The method of claim 1, further comprising
writing a configuration file to a sym file handle provided by the virtual file system, wherein the configuration file specifies the hierarchy of directories and files; and
in response to writing of the configuration file, establishing the hierarchy of directories and files by the virtual file system.

19. The method of claim 1, wherein the hierarchy of directories and files includes a directory with a plurality of region files, each region file associated with unused resources of the programmable IC.

20. A method for providing access to data in a programmable integrated circuit (IC), comprising:
maintaining a hierarchy of directories and files in a virtual file system that is registered with an operating system, wherein the directories and files are associated with resources of the programmable IC;
wherein the directories and files have names indicative of resources of the programmable IC;
in response to program calls to file system routines that reference the names of the files that indicate resources of the programmable IC,
invoking the virtual file system; and
accessing by the virtual file system state information in a bitstream file containing state information of resources of the programmable IC,
wherein the accessing includes:
reading configuration data into the bitstream file from a set of resources of the programmable IC in response to a call to a first file system routine that references the name of a file that indicates the set of resources;
writing configuration data from the bitstream file to a set of resources of the programmable IC in response to a call to a second file system routine that references the name of a file that indicates the set of resources; and
disabling a clock signal input to the programmable IC in response to a call to a third virtual file system function.

21. An apparatus for providing access to data in a programmable integrated circuit (IC), comprising:
means for maintaining a hierarchy of directories and files in a virtual file system that is registered with an operating system, wherein the directories and files are associated with resources of the programmable IC;
wherein the directories and files have names indicative of resources of the programmable IC; and
means, responsive to program calls to file system routines that reference the names of the files that indicate resources of the programmable IC, for invoking the virtual file system and accessing state information in resources of the programmable IC by the virtual file system,
wherein the means for accessing includes:
means for reading configuration data from a set of resources of the programmable IC in response to a call to a first file system routine that references the name of a file that indicates the set of resources;
means for writing configuration data to a set of resources of the programmable IC in response to a call to a second file system routine that references the name of a file that indicates the set of resources; and
means for disabling a clock signal input to the programmable IC in response to a call to a third virtual file system function.

22. An apparatus for providing access to data in a programmable integrated circuit (IC), comprising:
means for maintaining a hierarchy of directories and files in a virtual file system that is registered with an operating system, wherein the directories and files are associated with resources of the programmable IC;
wherein the directories and files have names indicative of resources of the programmable IC; and
means, responsive to program calls to file system routines that reference the names of the files that indicate resources of the programmable IC, for invoking the virtual file system and accessing by the virtual file system state information in a bitstream file containing state information of resources of the programmable IC,
wherein the means for accessing includes:
means for reading configuration data into the bitstream file from a set of resources of the programmable IC in response to a call to a first file system routine that references the name of a file that indicates the set of resources;
means for writing configuration data from the bitstream file to a set of resources of the programmable IC in response to a call to a second file system routine that references the name of a file that indicates the set of resources; and
means for disabling a clock signal input to the programmable IC in response to a call to a third virtual file system function.

23. An article of manufacture, comprising:
a processor-readable memory configured with instructions for causing a processor to perform the steps including,
maintaining a hierarchy of directories and files in a virtual file system that is registered with an operating system, wherein the directories and files are associated with resources of a programmable integrated circuit (IC);
wherein the directories and files are named to represent resources of the programmable IC;
in response to program calls to file system routines that reference the names of the files that indicate resources of the programmable IC,
invoking the virtual file system; and
accessing state information in resources of the programmable IC by the virtual file system,
wherein the accessing includes:
reading configuration data from a set of resources of the programmable IC in response to a call to a first file system routine that references the name of a file that indicates the set of resources;
writing configuration data to a set of resources of the programmable IC in response to a call to a second file system routine that references the name of a file that indicates the set of resources; and
disabling a clock signal input to the programmable IC in response to a call to a third virtual file system function.

24. A system for providing access to configurable logic resources on an integrated circuit (IC), comprising:
- a processor hosting an operating system, the operating system accessing a hierarchy of directories and files in a virtual file system, wherein the directories and files are associated with the configurable logic resources;
- wherein the directories and files have names indicative of resources of the IC; and
- code stored in a computer readable memory, the code having program calls to file system routines that reference the names of the files that indicate the configurable logic resources such that the virtual file system is invoked and state information in the configurable logic resources is accessed by the virtual file system,
- wherein the accessing includes:
  - reading configuration data from a set of resources of the programmable IC in response to a call to a first file system routine that references the name of a file that indicates the set of resources;
  - writing configuration data to a set of resources of the programmable IC in response to a call to a second file system routine that references the name of a file that indicates the set of resources; and
  - disabling a clock signal input to the programmable IC in response to a call to a third virtual file system function.

25. The system of claim 24 wherein the IC comprises an FPGA.

26. The system of claim 24 wherein the processor is an embedded processor on the IC.

27. The system of claim 24 wherein the processor is a processor external to the IC.

* * * * *